United States Patent [19]

Misumi

[11] Patent Number: 5,227,931
[45] Date of Patent: Jul. 13, 1993

[54] STEPPER MOTOR HEAD DRIVING DEVICE ACCOUNTING FOR HYSTERESIS ERROR

[75] Inventor: Hiroyoshi Misumi, Kanagawa, Japan

[73] Assignee: Canon Kabushiki Kaisha, Tokyo, Japan

[21] Appl. No.: 806,857

[22] Filed: Dec. 9, 1991

Related U.S. Application Data

[63] Continuation of Ser. No. 711,252, Jun. 4, 1991, abandoned, which is a continuation of Ser. No. 427,302, Oct. 26, 1989, abandoned.

[30] Foreign Application Priority Data

Oct. 31, 1988 [JP] Japan .................. 63-276873

[51] Int. Cl.⁵ ............................................. G11B 5/596
[52] U.S. Cl. ............................ 360/78.13; 360/77.06; 318/685
[58] Field of Search .................... 360/77.06, 78.13; 318/685, 696

[56] References Cited

U.S. PATENT DOCUMENTS

| | | | |
|---|---|---|---|
| 4,313,141 | 1/1982 | Yanigida et al. | 360/78.02 |
| 4,437,049 | 3/1984 | Tullos et al. | 360/78.08 X |
| 4,490,662 | 12/1984 | Moribe et al. | 318/685 |
| 4,689,700 | 8/1987 | Miyake et al. | 360/78.04 |
| 4,710,832 | 12/1987 | Itoh | 360/10.2 |
| 4,729,040 | 3/1988 | Miyake | 358/310 |

Primary Examiner—Joseph L. Dixon
Assistant Examiner—David L. Robertson
Attorney, Agent, or Firm—Robin, Blecker, Daley & Driscoll

[57] ABSTRACT

A head driving device includes a head driving mechanism which is arranged to shift, relative to a recording track formed on a recording medium, a head stepwise in units of a predetermined driving extent, a detection circuit which detects the level of a signal reproduced by the head, and a control circuit which controls the head driving mechanism to have the head shifted in the direction of obtaining the maximum output of the detection circuit. When the head shifting direction is reversed, the control circuit causes the head to be shifted in the reverse direction at least by two steps in units of the driving extent and determines the stopping position of the head on the basis of the output of the detection circuit obtained at each of head positions obtained at each step of shifting the head in the reverse direction.

23 Claims, 9 Drawing Sheets

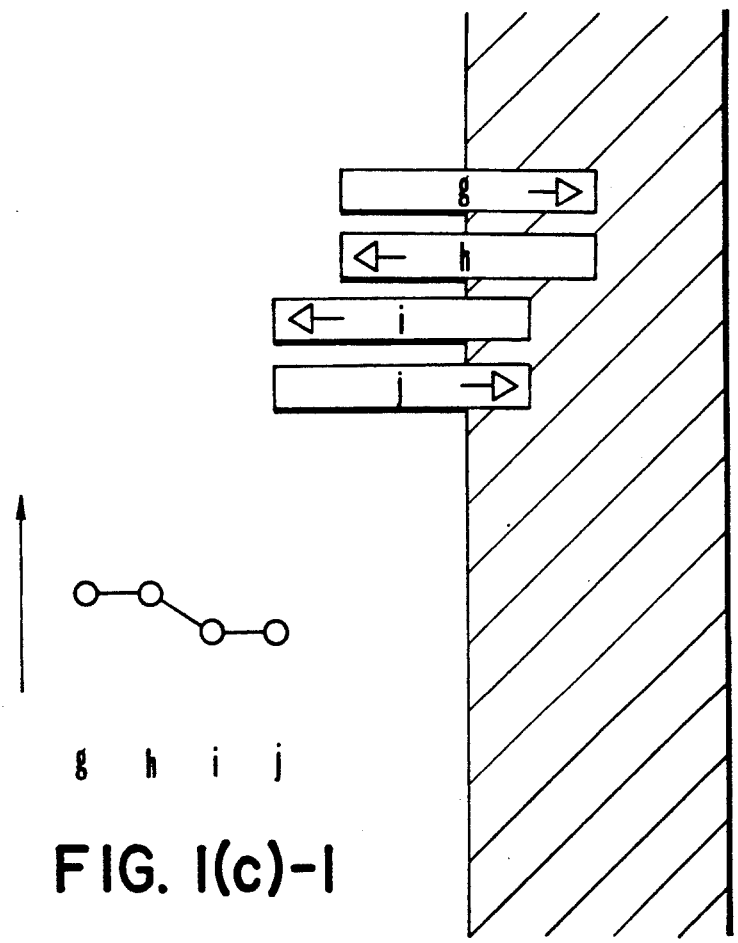
FIG. I(c)-1
FIG. I(c)-2

STEPPER MOTOR HEAD DRIVING DEVICE ACCOUNTING FOR HYSTERESIS ERROR

This is a continuation application under CFR 1.62 of prior application Ser. No. 711,252, filed Jun. 4, 1991, now abandoned, which is a continuation application under 37 CFR 1.62 of prior application Ser. No. 427,302, filed Oct. 26, 1989 now abandoned.

BACKGROUND OF THE INVENTION

1. Field of the Invention

This invention relates to an automatic track feeding (hereinafter referred to as ATF) device which is arranged to position a magnetic head at a recording track formed on a magnetic disc.

2. Description of the Related Art

As a result of recent advancement of the video recording technology, the recording methods employed in various video recording fields have come to attract attention. For example, the electronic still video (SV) camera is arranged to record video signals for fifty frames in a concentric state on a magnetic disc.

Generally, the recorded signal is reproduced from the magnetic disc by shifting a magnetic head to an applicable recording track with a stepping motor. In addition to that, the head is accurately positioned at the recording track by performing an ATF action. The conventional ATF action has been, for example, as shown in a flow chart in FIG. 1(a) of the accompanying drawings. The ATF action is performed to shift the magnetic head to the recording track position in such a way as to bring the reproduction output of the magnetic head to a maximum level thereof by comparing the sampled levels of an RF signal reproduced from the magnetic head (see FIGS. 1(b)-2 and 1(b)-2.

Referring to FIG. 1(a), the envelope level of the reproduced RF signal is sampled at a step 101. At a step 102: A check is made to see if the current sampling is the first sampling. If so, the flow of operation comes to a step 103. At the step 103: the magnetic head is shifted toward the outer circumference side of the magnetic disc to the unit moving extent (i.e., one step) of the stepping motor. The flow comes to a step 106. At the step 106: This envelope level is stored in a memory. The flow then comes back to the step 101. If the current sampling is found to be not the first sampling at the step 102, the flow comes from the step 102 to a step 104. At the step 104: The currently sampled envelope level is compared with a previously sampled envelope level stored in the memory. If the current envelope level is found to be higher than the previous envelope level, the flow proceeds to a step 105. At the step 105: The head is shifted one step further in the direction of the preceding shift. At a step 106: The current envelope level is stored in the memory and the flow comes back to the step 1.

Further, if the current envelope level is found to be lower than the previous envelope level at the step 104, the flow branches off to a step 107. At the step 107: The current head position is checked to see if it is located one step away from the initial position on the outer circumference side. If so, the flow proceeds to a step 108 to have the head shifted two steps toward the inner circumference side by the stepping motor and then comes back to the step 101.

If the head position is found to be on the inner circumference side of the initial position at the step 107, the flow proceeds to a step 109 to have the head shifted by one step in the direction reverse to the preceding shift. The ATF action then comes to an end.

More specifically, the ATF action is described as follows: As shown in FIGS. 1(b)-1 and 1(b)-2, the action is assumed to begin when the head is located in a position "a" which is off the track on the outer circumference side thereof. The envelope level of the reproduced RF signal obtained in this position is stored. Then, this stored level is compared with the envelope level obtained in another position "b" by shifting the head one step toward the outer circumference side by means of the stepping motor. In this instance, the envelope level lowers as the head moves further away from the track. When the envelope level thus lowers, the head is shifted two steps in the direction reverse to the preceding shift, i.e., toward the inner circumference side of the magnetic disc, to bring the head to a position "c". The head is then shifted further stepwise while comparing the envelope level with a previous level at each step. The head is shifted back one step when the envelope level again comes to lower (at a position "e") and the ATF action comes to an end (at a position "f"). The head thus can be correctly positioned on the recording track.

This action accurately shifts the head either toward the outer circumference side or toward the inner circumference side of the magnetic disc with adequate responsivity.

However, since the magnetic head is shifted by the stepping motor generally through a mechanical part such as gears, there arises some hysteresis due to a mechanical play. Besides, the hysteresis varies with the ambient temperature as well as the degree of wear. When the hysteresis increases to a degree corresponding to one step or thereabout, the ATF action becomes as shown in FIGS. 1(c)-1 and 1(c)-2. Referring to FIGS. 1(c)-1 and 1(c)-2, in this case, with the magnetic head assumed to be shifted from the outer circumferential side of the disc and the ATF action to begin from a position "g", the head is first shifted toward the outer circumference side. However, with the hysteresis corresponding to one step, the head is merely shifted to a position "h" which is almost the same as the position "g" and hardly allows comparison. As a result, the ATF action comes to an end at a position "j". Under that condition, it is hardly possible to accurately position the head on the recording track.

Further, in the ATF action, the magnetic head is controlled to be shifted to the position where the maximum (envelope) level of the reproduced RF signal is obtained. However, with a stepping motor used for shifting the head, the motor comes to a stop in a digital position. Theoretically, therefore, the maximum error of the ATF action becomes ½ step from the position where the envelope level reaches its maximum value. Then, with the above-stated hysteresis added to the maximum error, the arrangement to simply shift the head by one step in the direction reverse to the preceding shift at the step 109 when the peak of the envelope level is passed during the ATF action brings a maximum possible error between the shifted position of the head and the peak position of the envelope level up to a value of "½ step + the degree of error caused by the hysteresis". This error exceeds an allowable limit for the electronic still video camera which is arranged to perform recording and reproducing operation on each recording track measuring 60 μm in width and having a guard band of 40 μm. This has presented a serious problem.

SUMMARY OF THE INVENTION

This invention is directed to the solution of the above-stated problem. It is therefore a first object of this invention to provide a head driving device which is capable of accurately positioning a magnetic head for a recording track formed on a recording medium.

It is a second object of the invention to provide a head positioning device which is arranged to enhance head positioning accuracy without being affected by any mechanical error due to the back-lash or the like of a head driving mechanism.

It is a third object of the invention to provide a novel ATF device which reduces the ATF error for a head relative to a recording track to one half of the error inevitable with the conventional ATF device.

It is a fourth object of the invention to provide a recording or reproducing apparatus which is capable of performing a recording or reproducing operation with a high degree of accuracy by accurately positioning the recording or reproducing head.

Under these objects, a head driving device arranged as a preferred embodiment of the invention comprises head driving means arranged to shift a head stepwise relative to a recording track on a recording medium to a given unit driving extent at each step; detecting means for detecting the level of a signal reproduced by the head; and control means for controlling head driving means to have the head shifted in the direction of obtaining the maximum output of detecting means. Control means is arranged to cause the head to be shifted by at least two steps in the direction reverse to the preceding shift of the head when the shifting direction of the head is reversed and to determine the stopping position of the head on the basis of the output of detecting means produced at each of the shifted positions of the head. Therefore, the position of the head relative to the recording track can be accurately controlled even in the event of an error between the head position and the driving position of head driving means.

A head positioning device arranged according to this invention as an embodiment thereof comprises head driving means for shifting a head relative to a recording track on a recording medium; control means for controlling head driving means to have the head shifted in the direction of increasing the level of a signal reproduced by the head; and means for changing the number of head driving steps of head driving means when the head driving direction is reversed.

Further, a reproducing apparatus which is arranged as a preferred embodiment of the invention to be capable of accurately positioning a reproducing head relative to a recording track even in the event of positional deviation caused by a back-lash or the like between head driving means and the head comprises: a reproducing head arranged to reproduce a signal recorded on a recording track formed on a recording medium; head driving means for shifting the reproducing head stepwise to a given unit driving extent in the direction of increasing level of a signal reproduced by the head; and control means for controlling the head driving means in such a way as to change the number of head driving steps when the head driving direction is reversed.

The above and further objects and features of the invention will become apparent from the following detailed description of embodiments thereof taken in connection with the accompanying drawings.

BRIEF DESCRIPTION OF THE DRAWINGS

FIGS. 1($b$)-1 and 1($c$)-1, 1($c$)-2 show the position of a head in relation to a recording track.

FIGS. 5($a$)-1, 5($a$)-2 and 5($b$)-1, 5($b$)-2 show the relation of a head to a recording track brought about by the ATF operation of the embodiment of the invention.

DETAILED DESCRIPTION OF THE PREFERRED EMBODIMENTS

Figure 1A:
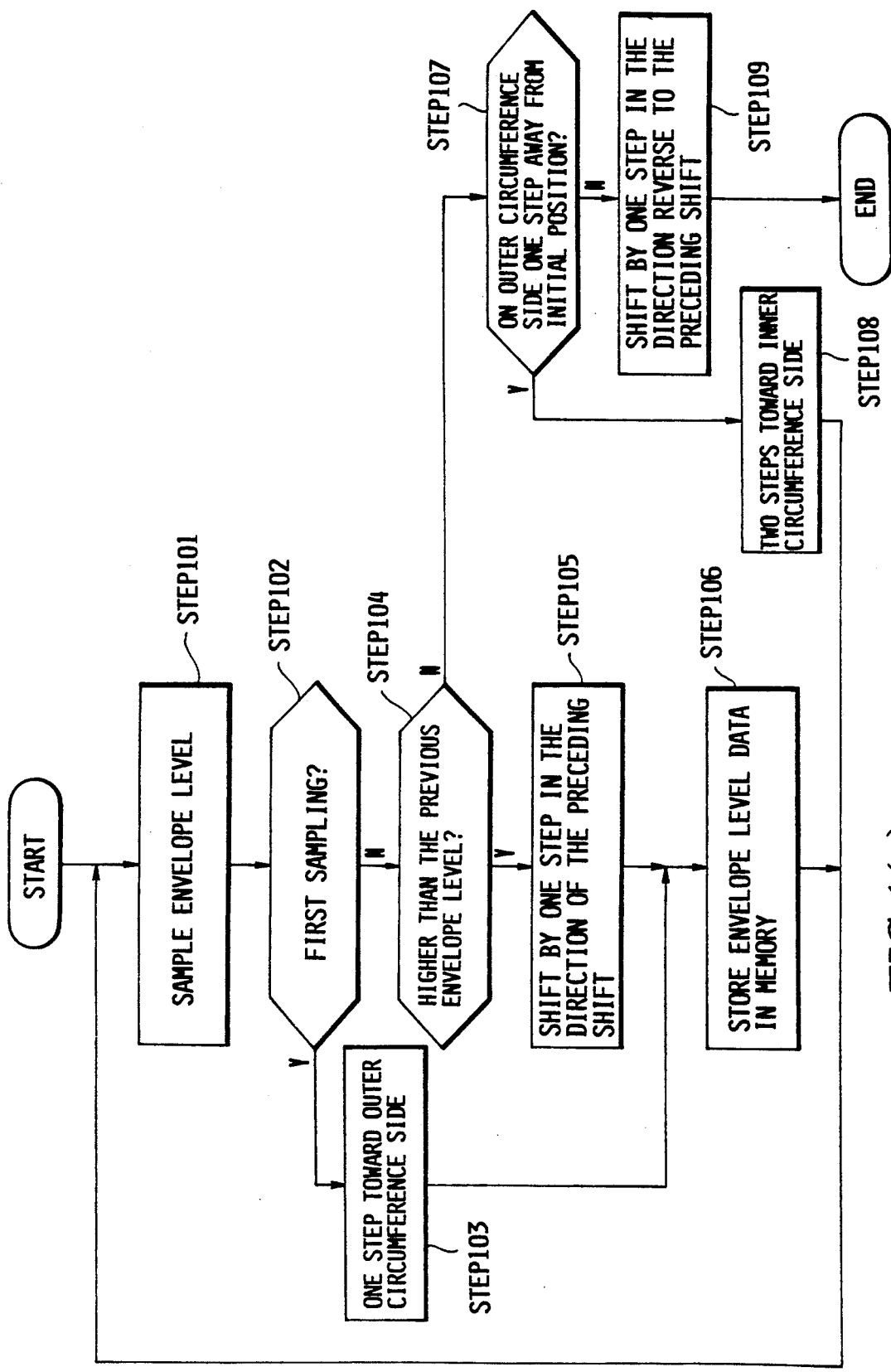
FIG. 1($a$) is a flow chart showing the conventional ATF operation.
Figures 1, 1B, 2:
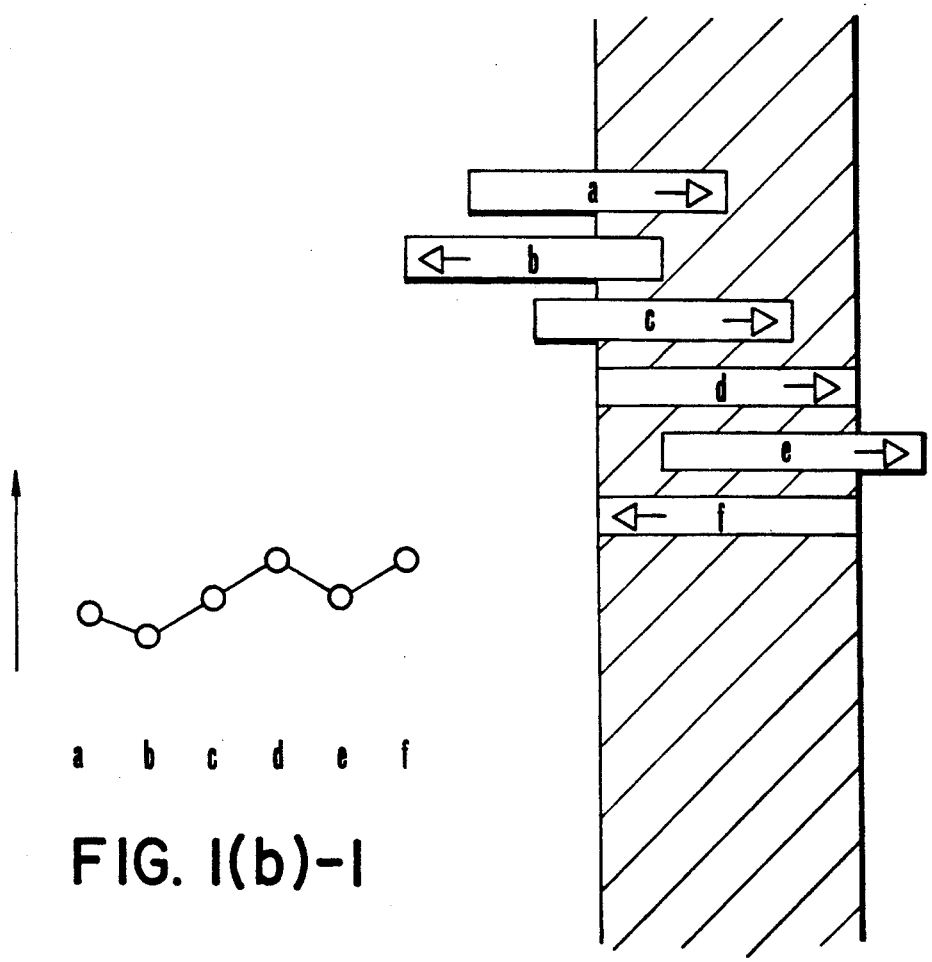
FIG. 2 is a block diagram showing a head driving device arranged according to this invention as an embodiment thereof.
Figure 2:
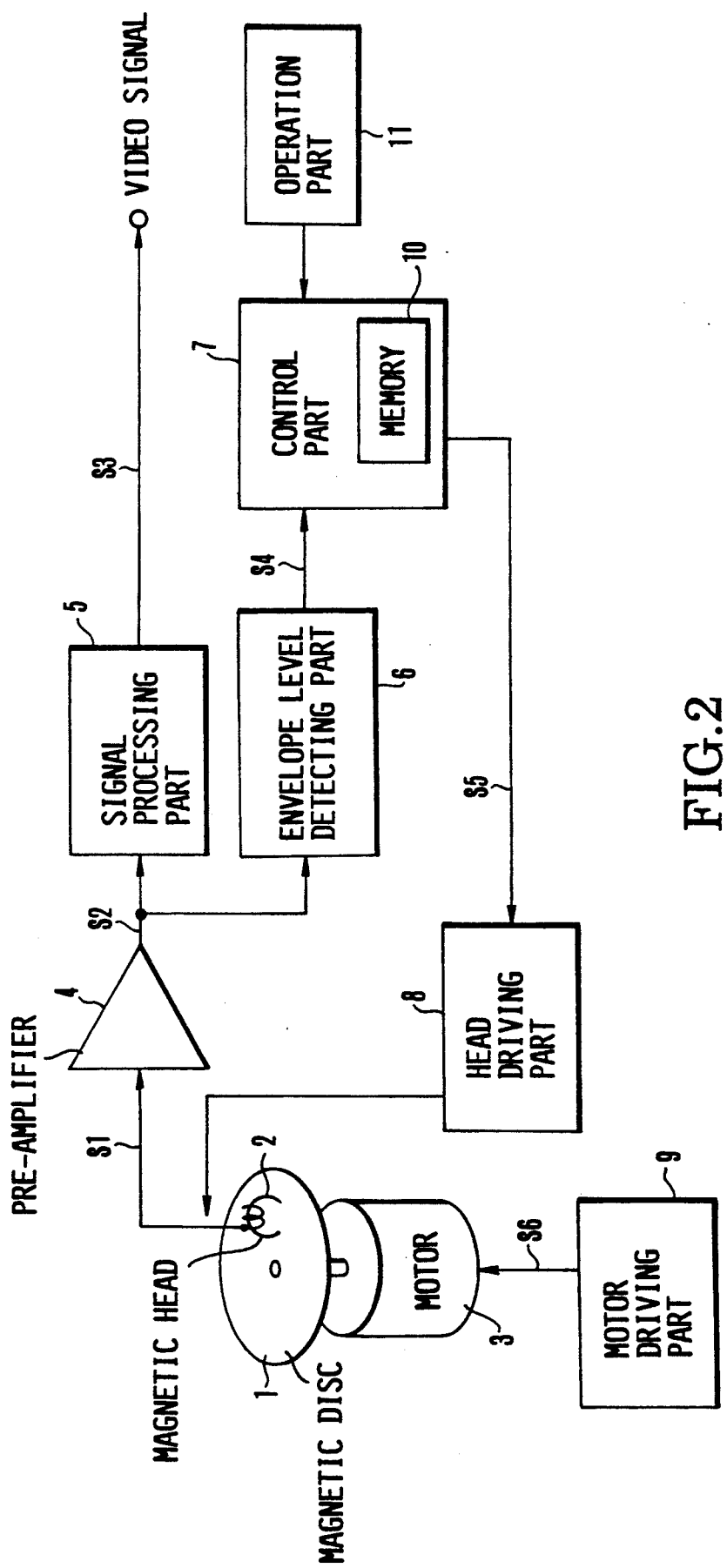

The following describes in detail the head driving device of this invention through an embodiment thereof shown in the drawings: FIG. 2 is a block diagram showing the invented head driving device. The illustration includes a magnetic disc 1; a magnetic head 2; a motor 3 which is arranged to rotate the magnetic disc 1; a preamplifier 4 which is arranged to amplify a reproduced signal obtained from the magnetic head 2; a signal processing part 5 which is arranged to perform a signal processing operation on the output of the preamplifier 4 including demodulation and deemphasis processes; an envelope level detecting part 6 which is arranged to detect the envelope level of the reproduced RF signal obtained from the magnetic head 2; a control part 7 which is arranged to detect the deviation of the magnetic head from a recording track formed on the magnetic disc and to produce a control signal for correction; a head driving part 8 including a head shifting mechanism which is arranged to shift the magnetic head 2; a motor driving part 9 which is arranged to cause the motor 3 to rotate at a predetermined constant speed; a memory 10 in the control part 7; and an operation part 11 which is arranged to designate a track to which the head 2 is required to gain access. A reference symbol S1 denotes the reproduced RF signal output from the magnetic head 2. A symbol S2 denotes a signal obtained by amplifying the signal S1. A symbol S3 denotes a video signal output from the signal processing part 5. A symbol S4 denotes the level of the reproduced RF signal detected by the envelope level detecting part 6. A symbol S5 denotes a head position control signal, and symbol S6 a motor driving signal for rotating the magnetic disc 1.

Figure 3:
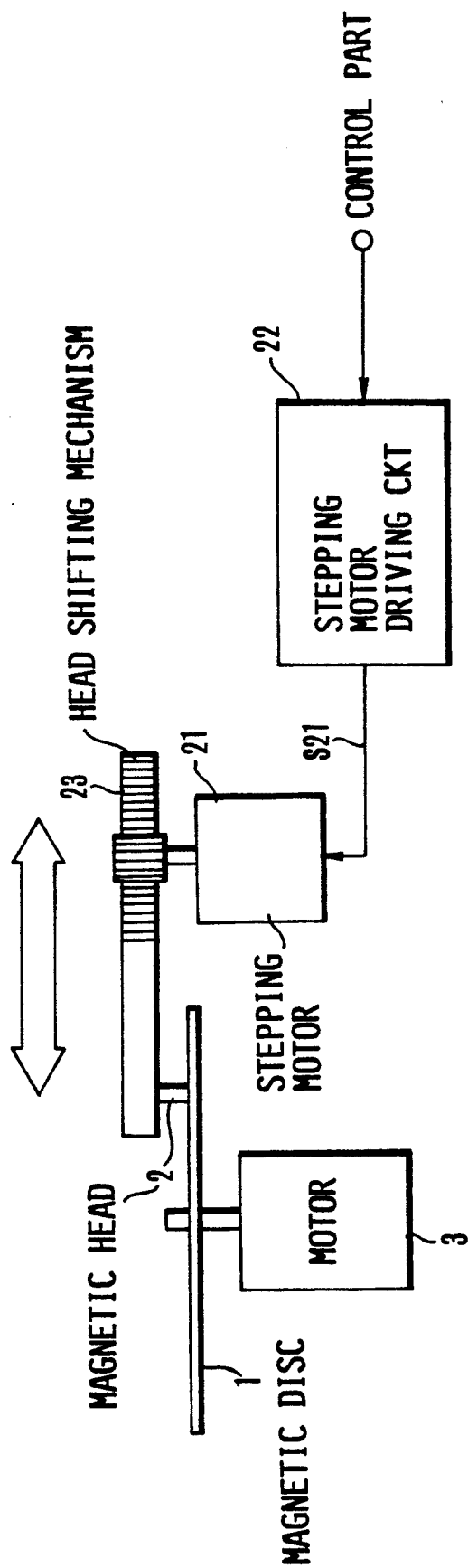
FIG. 3 shows the arrangement of a head shifting mechanism arranged according to the invention.

FIG. 3 shows an arrangement for shifting the magnetic head 2. Referring to FIG. 3, a stepping motor 21 is arranged to shift the head 2. A stepping motor driving circuit 22 is arranged to drive the motor 21. A head shifting mechanism 23 is arranged to shift the magnetic head 2 radially on the magnetic disc 1. A reference symbol S21 denotes a stepping motor driving signal. The magnetic disc 1 is arranged to be rotated at a given speed with the motor 3 driven by the motor driving part 9. Meanwhile, the magnetic head 2 is caused to gain access to a recording track formed on the magnetic disc 1. A signal recorded in the recording track is thus reproduced by the magnetic head 2. The reproduced signal is processed through the pre-amplifier 4 and the signal processing part 5 into a video signal S3. The video signal S3 thus obtained is supplied, for example, to a monitor or the like to be displayed by the monitor.

The reproduced RF signal S2 output from the pre-amplifier 4 is supplied to the envelope level detecting part 6. The envelope level signal S4 thus obtained is supplied to the control part 7. The control part 7 controls the head driving part 8 in accordance with an ATF action control flow (to be described later) on the basis of a change in the envelope level according to the head position. The position of the head 2 relative to the track is thus controlled in accordance with the flow of the control operation.

The operation part 11 enables the operator to instruct the control part 7 to designate the track of a record to be reproduced. In response to this, the control part 7 causes the head 2 to be shifted to this track.

Figure 4:
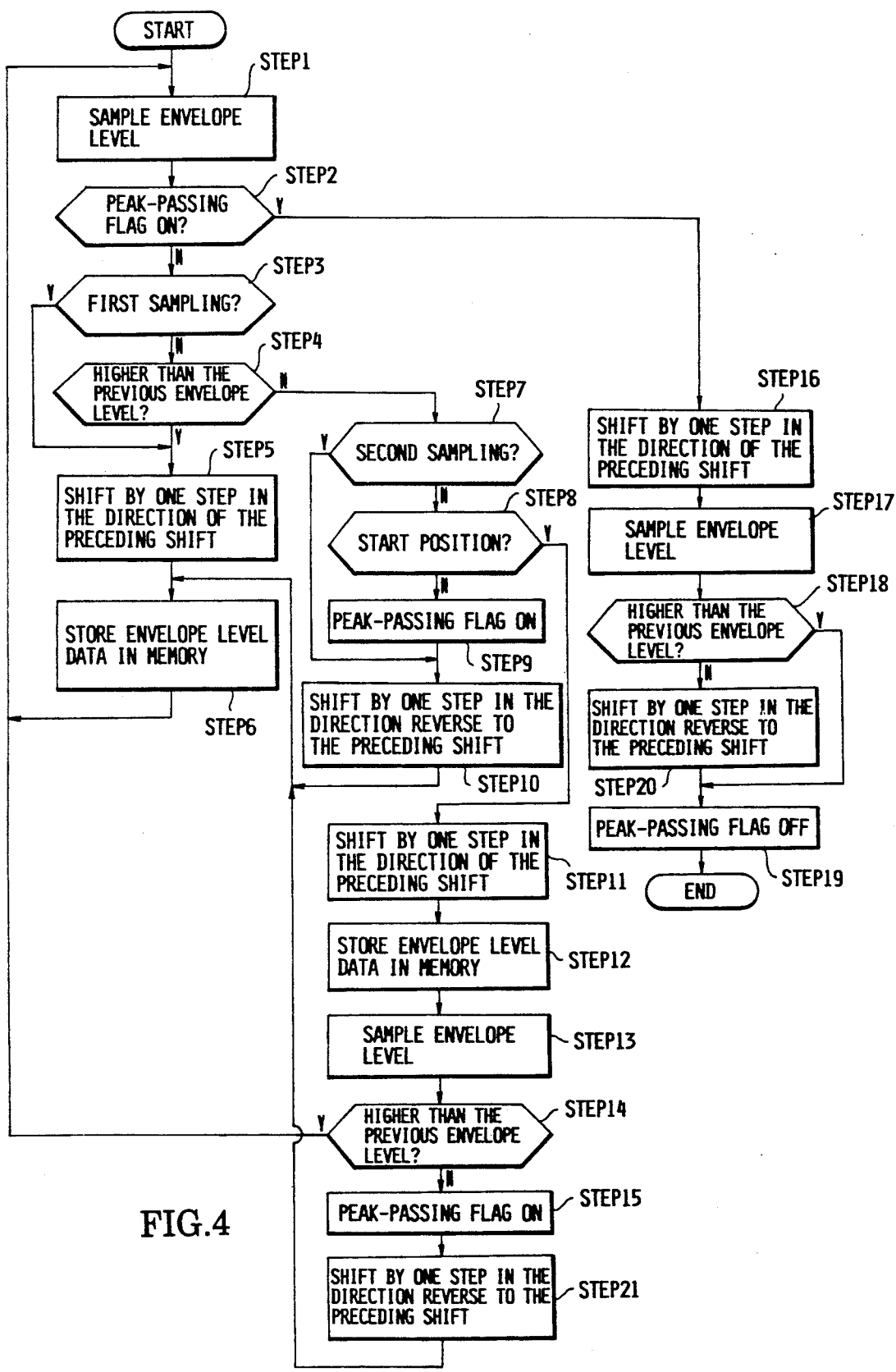
FIG. 4 is a flow chart showing the ATF operation of the embodiment of the invention.

A more detailed description of the head position control operation is as follows: FIG. 4 is a flow chart showing the head position control. When the magnetic head 2 is shifted by operating the head shifting mechanism 23 to the track of the record to be reproduced, the head is moved to a generally adopted standard mechanical track position (an absolute track position). The ATF action is caused to begin at this position. While the magnetic head 2 is shifted step by step to a minimum unit driving extent at a time, the output level of a reproduced RF signal obtained by each step is compared with the level obtained by another. The head position control operation is performed by thus shifting the head 2 in the direction of increasing the output level.

Further, in accordance with the ATF control algorithm of this invention, the first head shifting step of the ATF action is taken in the same direction as the direction in which the head has been shifted to the above-stated track. The reason for this is as follows:

In cases where a head shifting system which consists of the head shifting mechanism 23 and the stepping motor 21 has a hysteresis due to some play or back-lash as mentioned in the foregoing, the head is shiftable to the predetermined extent of step in the same shifting direction. However, if the head shifting direction is reversed under this condition, it is impossible to shift the head completely covering a distance corresponding to a head shifting number of steps required in the reverse direction. Therefore, if the window width of the hysteresis is about the same as one step, the reversely shifted head position would be short by one step to result in a faulty ATF action. To avoid this, in accordance with the invention, the first step of the ATF action is taken in the same shifting direction which causes no error.

Figures 1, 2, 5A:
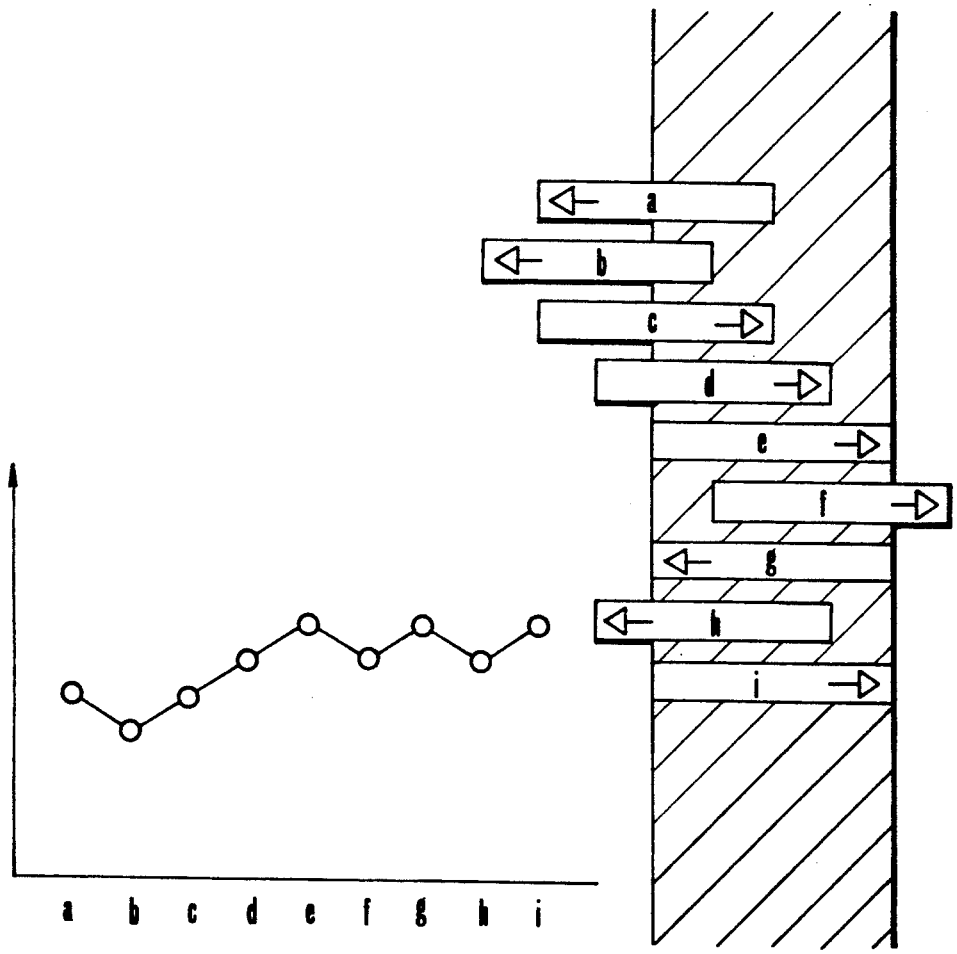
Figures 1, 2, 5B:
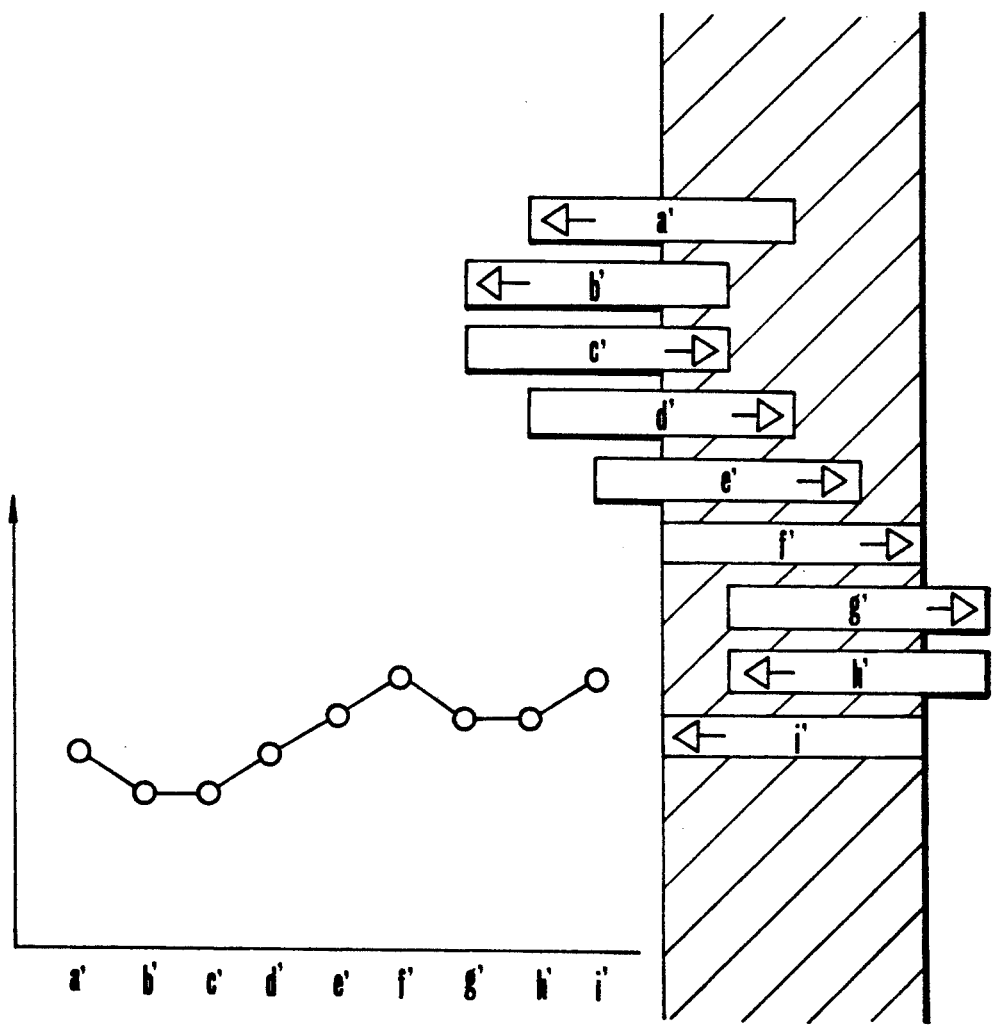

FIGS. 5(a)-1 and 5(a)-2 and FIGS. 5(b)-1 and 5(b)-2 show the head shifting positions obtained by the ATF action and the changes taking place in the envelope level with time. FIGS. 5(a)-1 and 5(a)-2 represent an ideal case where there is no hysteresis. FIGS. 5(b)-1 and 5(b)-2 represent a case where the hysteresis is large corresponding to about one step or more than one step.

Referring to FIGS. 5(a)-1 and 5(a)-2 and FIGS. 5(b)-1 and 5(b)-2 along with the flow chart of FIG. 4, the ATF action will be described below. As mentioned above, FIG. 4 is a flow chart showing the control operation of the invented head driving device.

The operation in the ideal case where the driving action of the head shifting stepping motor 21 accurately results in the positional change of the head 2 with the head shifting mechanism 23 having no hysteresis as shown in FIGS. 5(a)-1 and 5(a)-2 is as follows: The head driving part 8 brings the magnetic head 2 to the track of a record to be reproduced. Then, the ATF action begins. The head 2 is assumed to be shifted to a mechanical track position "a" from the inner circumference side of the disc as shown in at the right hand side of FIG. 5(a)-2.

At the step 1 of the flow chart of FIG. 1: The envelope level of the reproduced signal is first sampled at the initial position (the position "a") of the magnetic head 2. The sampled level is taken in an accumulator or a register or the like which is arranged as a temporary memory in the control part 7. The flow of operation proceeds to a step 2. Step 2: A peak-passing flag which is arranged to be turned on when the envelope level of the output of the head is lastly found to be at its highest value is checked for its state. If the flag is found to be off, the flow proceeds to a step 3. Since the flag is always in a reset state (off-state) at the beginning of the ATF action, the flow comes to the step 3 in this instance. Step 3: A check is made to find if the sampling made at the step 1 is a first sampling action after commencement of the ATF action. If so, the flow comes to a step 5. The head 2 is shifted one step (minimum unit driving distance of the stepping motor 21) further in the direction of the preceding shift, i.e., toward the outer circumference side, to bring the head to a position "b". Step 6: Then, the data of envelope level obtained at the head position "a" and sampled at the step 1 is stored in the memory 10 which is disposed in the control part 7. The flow then comes back to the step 1 to sample the envelope level obtained at the head position "b". Since the sampled level has not reached its maximum value as yet, the peak-passing flag is found to be off at the step 2. At the step 3, the sampling is found to be not the first sampling. Therefore, the flow this time comes to a step 4. At the step 4: The envelope level currently obtained at the head position "b" is compared with the stored envelope level which has previously been obtained at the position "a" and stored in the memory 10. If the current envelope level is found to be higher than the stored (previous) level, the flow would proceed to the step 5 to further shift the head in the same direction. However, since the envelope level obtained at the head position "b" is lower than the level obtained at the previous position "a" as shown in FIG. 5(a), the result of the check made at the step 4 is "No" and the flow comes to a step 7. Step 7: A check is made for the second sampling. Since the envelope level is sampled for the second time after the start of the ATF action, the result of the check is "Yes" and the flow comes to a step 10. At the step 10: The head 2 is shifted backward in the direction reverse to the preceding shift to the extent of one step of the stepping motor 21. This, brings the head 2 to a position "c" as shown in FIGS. 5(a)-1 and 5(a)-2. The flow then jumps to the step 6 to have the current envelope level data obtained at the head position "b" stored in the memory 10. The flow again comes back to the step 1. At the step 1, the envelope level obtained at the head position "c" is sampled. At the step 2, the peak-passing flag is found to be in its off-state. At the step 3, the sampling is determined to be not the first sampling. At the step 4, the envelope level obtained at the position "c" is compared with the previous level obtained at the position "b" and stored in the memory 10. Since the head position "c" is more on the track than the head position "b" as shown in FIGS. 5(a)-1 and 5(a)-2, the envelope level at the position "c" is higher than that at the position "b". Therefore, the result of a check made at the step 4 is "Yes". The flow comes to the step 5 to have the head 2 shifted further in the direction of the preceding shift, i.e., toward the inner circumference side by one step to a position "d". Then, the flow comes to the step 6 to have the latest data of the envelope level (obtained at the position "c") stored in the memory 10. The flow again comes back to the step 1. At the step 1, the envelope level obtained at the head position "d" is sampled. The flow comes to the steps 2 and 3 to have the result of check "No" at each of these steps. At the step 4, the envelope level obtained at the head position "d" is compared with the level which has previously been obtained at the head position "c" and stored in the memory 10. If the level at the position "d" is found to be higher than the level at the position "c", the flow comes to the step 5 to have the head 2 further shifted by one step in the direction of the preceding shift to bring the head 2 to a position "e". Then, at the step 6, the data of the envelope level obtained at the head position "d" is stored in the memory 10. Again the flow comes back to the step 1 to repeat the same flow of process as described above. The flow is repeated to have the head 2 shifted step by step in the same direction until the current envelope level becomes lower than the previous envelope level and the result of the check made at the step 4 becomes "No".

With the above-stated flow repeated, when the envelope level obtained at a head position "f" of FIGS. 5(a)-1 and 5(a)-2 is found at the step 4 to be lower than the envelope level obtained at the previous head position "e" and stored in the memory 10, the flow comes to a step 7. At the step 7, the current envelope level sampling is checked to see if it is the second sampling. Following this, the flow comes to a step 8. At the step 8, the driving step of the stepping motor 21 is checked for its start position. Since the head 2 is in the head position "f" in this instance, the result of the check is "No" and the flow comes to a step 9.

Step 9: Since the envelope level has come to drop with the head 2 having been shifted in the direction of increasing the envelope level, this indicates that a peak value point (i.e., the maximum value range) of the envelope level has been passed. To indicate this, the peak-passing flag is set into its on-state. At a step 10: The head is shifted in the direction reverse to the preceding shift to the extent of one step of the stepping motor. This brings the head 2 to a position "g" of FIGS. 5(a)-1 and 5(a)-2. The flow then comes back to the step 6 to have the data of the envelope level obtained at the head position "f" stored in the memory 10. After that, the flow comes back to the step 1 to have the envelope level sampled at the head position "g" and then comes to the step 2. At the step 2, a check is made for the state of the peak-passing flag. Since the flag has been set in its on-state, the flow jumps from the step 2 to a step 16. At the step 16: The head 2 is shifted to a position "h" by moving it one step further with the stepping motor 21 rotated in the direction in which the head has been shifted. Step 17: The envelope level obtained at the head position "h" is sampled. Step 18: The level sampled is compared with the envelope level which has been obtained at the previous head position "f" and stored in the memory 10. If the level obtained at the position "h" is found to be lower than the level obtained at the position "f", the flow comes to a step 20. At the step 20: The head is shifted by the stepping motor 21 to a position "i" by shifting the head in the direction reverse to the preceding shift by one step. Step 19: The peak-passing flag is turned off and the ATF control action comes to an end.

Further, if the current envelope level is found at the step 18 to exceed the previous envelope level, the head 2 is stopped in the current position.

A feature of the control action described lies in the comparison made at the step 18 of the flow. In the case of FIGS. 5(a)-1 and 5(a)-2, the ATF action is accomplished by an ideal head shifting mechanism. Therefore, the head is shifted to an on-track state through the stepwise shift of the head from the position "a" to the position "i". In actuality, however, the head shifting mechanism 23 more or less has the hysteresis. This inevitably brings about a discrepancy between the head shifting position of the stepping motor 21, as considered in terms of phasic energized state of the motor, and the actually shifted position of the head 2. In view of this, at the step 18 of the flow of operation described above, the head 2 is not considered to be completely set in the theoretical on-track state in the head position "g" obtained by shifting the head backward by one step from the head position "f" after detection of passing of the peak value of the envelope level. The head 2 is, therefore, further shifted to the position "h" by moving it backward by another step. Then, the envelope level obtained at the head position "h" is compared with the level obtained at the position "f". If the level at the position "f" is higher than the level at the position "h", the head position "h" is off the track. In that instance, the previous head position "g" is considered to be the best head position. The head 2 is, therefore, shifted backward by one step to the position "i" for bringing it into an on-track state. If the envelope level at the position "f" is lower than the level at the position "h", the head 2 is considered to have not actually been shifted, due to the hysteresis, when having shifted from the position "f" to the position "g". In that event, the head position "h" is considered to be the best head position.

To facilitate a clear understanding of the arrangement and operation of the embodiment of this invention, the flow of ATF control shown in FIG. 4 is further described as follows with reference to FIGS. 5(b)-1 and 5(b)-2: In the case of FIGS. 5(b)-1 and 5(b)-2, the actual shifted position of the head 2 is assumed to be deviating from the head shifting position of the stepping motor 21 to an extent approximately corresponding to one step of the stepping motor 21.

Assuming that the head 2 is shifted from the inner circumference side of the disc to the track of a record to be reproduced and, is in a mechanical shifted position a' as shown in FIGS. 5(b)-1 and 5(b)-2, no positional deviation due to the hysteresis appears as long as the head is shifted in the same direction. The head position is, however, greatly affected by the hysteresis when the head shifting direction is reversed.

At the step 1, the envelope level of the output of the head 2 obtained at the above-stated position a' is sampled. After discrimination between "No" and "Yes" at the steps 2 and 3, the head 2 is shifted to another position b' at the step 5. The envelope level obtained at the position a' is stored in the memory 10. The flow then comes back to the step 1 to have the envelope level at the position b' sampled. After the discrimination made at the steps 2 and 3, the flow comes to the step 4. At the step 4, the envelope level obtained at the position b' is compared with the level obtained at the position a'. Since the envelope level should have decreased at the position b′, the flow comes to the step 7. After the result of check "Yes" is obtained at the step 7, the flow comes to the step 10 to have the head 2 shifted in the direction reverse to the preceding shift by one step of the stepping motor 21. If there is no hysteresis, the head would be shifted to the position "c" of FIGS. 5(a)-1 and 5(a)-2. However, in this case, the above-stated hysteresis causes the head 2 to be actually little shifted from the position b′ as indicated by a shifted position c′ in FIG. 5(b)-5(b)-2.

At the step 6, the envelope level obtained at the position b′ is stored in the memory 10. The flow comes to the step 1. At the step 1, the envelope level obtained at the position c′ is sampled. After the result of check "No" is obtained at each of the steps 2 and 3, the flow comes to the step 4 to compare the envelope levels obtained at the head positions b′ and c′. Assuming that these levels are equal to each other, though the actual difference in value between them is unknown, the result of the check made at the step 4 is "No". The flow, therefore, comes to the step 7. At the step 7, the result of check "No" is obtained. The flow comes to the step 8. The term "start position" shown at the step 8 means the rotating position of the stepping motor 21 corresponding to the start position of the ATF action and does not mean the actual position of the head. In respect to the phasic energized state of the stepping motor 21, the rotating position of the stepping motor 21 obtained at the head position c′ is the start position (equal to the head position a′), because the head 2 is shifted backward by one step after it has been shifted by one step from the position a′ The result of the check made at the step 8, therefore, is "Yes". The flow thus branches to the step 11.

At the step 11, the head 2 is shifted one step by the stepping motor 21 in the direction in which the head 2 has been shifted. As a result, the head 2 comes to a position d′. Step 12: The data of the envelope level obtained at the head position c′ is stored in the memory 10. Step 13: The envelope level obtained at the head position d′ is sampled. Step 14: The envelope level at the position d′ is compared with the envelope level at the position c′ which has previously been obtained. If the head 2 is closer to its on-track state in the position d′, the envelope level at the position d′ is higher than the level at the position c′. In that case, the flow comes back to the step 1.

At the step 1, the envelope level obtained at the head position d′ is again sampled. The sampling process at the step 1 is provided only for the sake of illustration of the control flow. The sampling at the step 1 may be omitted as the envelope level at the position d′ has already been sampled at the step 13. The flow, therefore, may be changed to come back from the step 14 to the step 2 instead of the step 1.

After the result of check "No" is obtained at each of the steps 2 and 3, the flow comes to the step 4. At the step 4, the envelope levels at the head positions c′ and d′ are compared with each other. If the level at the position d′ is higher, the flow proceeds to the steps 5 and 6. The head 2 is thus shifted by one step at a time in the direction of having a higher envelope level by repeating the steps 1 to 6 until the envelope level again comes to drop.

With these steps repeated, the head 2 is shifted to a position g′ at the step 5. At the step 6, the current sample of envelope level data obtained at the head position f′ is stored in the memory 10. At the step 1, the envelope level obtained at the head position g′ is sampled. After obtaining the result of check "No" at each of the steps 2 and 3, the flow comes to the step 4 to compare the envelope levels at the head positions f′ and g′. In the case of FIGS. 5(b)-1 and 5(b)-2, the head position g′ is off the track to give a lower envelope level. Therefore, the flow comes to the step 7. After obtaining the result of check "No" at each of the steps 7 and 8, the flow comes to the step 9. At the step 9, the peak-passing flag is turned on to indicate that the peak of the envelope level has been passed. At the step 10, the head 2 is shifted in the direction reverse to the preceding shift by the stepping motor 21 to the extent of one step of the motor 21. However, again the shifted position of the head 2 is affected by the hysteresis due to the play of the head shifting mechanism 23. As a result, the actual shifted position h′ is almost the same as the position g′. The flow then comes to the step 6 to store the data of the envelope level at the head position g′ in the memory 10. The flow comes back to the step 1. At the step 1, the envelope level obtained at the head position h′ is sampled. The flow proceeds to the step 2. At the step 2, the peak-passing flag is found to be in its on-state. The flow comes to the step 16. At the step 16, the head 2 is shifted one step further in the direction in which the head 2 has been shifted to bring the head 2 to a position i′ as shown in FIGS. 5(b-1 and 5(b)-2. The flow then comes to the step 17 to sample the envelope level obtained at the head position i′. The flow proceeds to the step 18 to compare the envelope level sampled with the level obtained at the head position g′ and currently stored in the memory 10. In other words, like in the case of FIGS. 5(a)-1 and 5(a)-2, the level obtained at the position g′ is not compared with the level obtained at the position h′ but is compared with the level obtained at the head position i′ which is obtained by shifting the head 2 further backward by one step from the position h′. If the level at the position i′ is higher than the level at the position g′ as apparent from FIGS. 5(b)-1 and 5(b)-2, the flow comes to the step 19 to terminate the ATF action by resetting the peak-passing flag into its off-state. If the level at the position g′ is found to be higher than the level at the position i′ at the step 18, this indicates that the hysteresis is not much and that the head position g′ is not much deviating from the on-track state. Then, the backward shifting by two steps including the positions h′ and i′ brings the head 2 into a greatly off-track state. In that case, the flow comes to the step 20. At the step 20, the head 2 is shifted backward by one step and the ATF action comes to an end.

In the foregoing, the ATF action is described by dividing it into two cases, one having no hysteresis as shown in FIGS. 5(a)-1 and 5(a)-2 and the other having a hysteresis to a degree corresponding to one step of the stepping motor as shown in FIGS. 5(b)-1 and 5(b)-2. In either case, the position of the head 2 is determined by first detecting a position obtained by shifting the head one step backward from an on-track point where the envelope level of the signal reproduced by the head 2 just has passed its peak to come to an off-track point; by shifting the head backward one step further to detect once again the envelope level there; by comparing the two envelope levels thus detected with each other; and by setting the head in one of the two positions that gives a higher envelope level. Unlike the conventional ATF arrangement, the invented arrangement ensures the best head position relative to the track without causing any faulty action even if the head shifting mechanism 23 has a hysteresis due to the play, etc.

As apparent from the envelope level curves of the graphs shown in FIGS. 5(a)-1 and 5(a)-2 and FIGS. 5(b)-1 and 5(b)-2, the head is shifted to a position where the reproduced envelope level comes to its peak value.

Referring further to FIGS. 5(b)-1 and 5(b)-2, when the head is shifted from the position c' to the position d', the envelope levels obtained at the two positions are compared with each other at the step 14 of the flow chart described. If the level of the position d' is found to be lower than that of the position c', this indicates a case where the head is allowed by the smallness of the hysteresis to come to an on-track state when the head is shifted from the position b' to the position c' and is then brought into an off-track state when it is shifted from the position c' to the position d'. Since the peak point of the envelope level has been passed in this instance, the flow comes from the step 14 to the step 15 to set the peak-passing flag into its on-state. At the step 21, the head shifting direction is reversed to shift the head one step backward to the position c'. The flow then comes to the step 6 to have the envelope level at the position d' stored in the memory flow comes back to the step 1 to have the envelope level at the position d' sampled. At the step 2, the result of check "Yes" is obtained. The flow comes from the step 2 to the step 16. At the step 16, the head is shifted one step further in the direction in which the head has been shifted. At the step 17, the envelope level is sampled. At the step 18, the envelope levels obtained before and after the shift of head position are compared with each other. The head is then shifted to one of the positions that gives a higher envelope level than the other. The flow then comes to an end. In other words, after the envelope level has passed its peak value point, the head is shifted back by one step and then by another step. Then, the envelope levels obtained at the one-step moved back position and at the two-step moved back position are compared. The head is set in one of the two positions that gives a higher envelope level than the other in exactly the same manner as in the first case of the ATF action described in the foregoing. This enables the embodiment to reliably shift the head to its best on-track position even in cases where the head 2 cannot be accurately shifted by the stepping motor 21 because of the hysteresis, etc.

Figure 6:
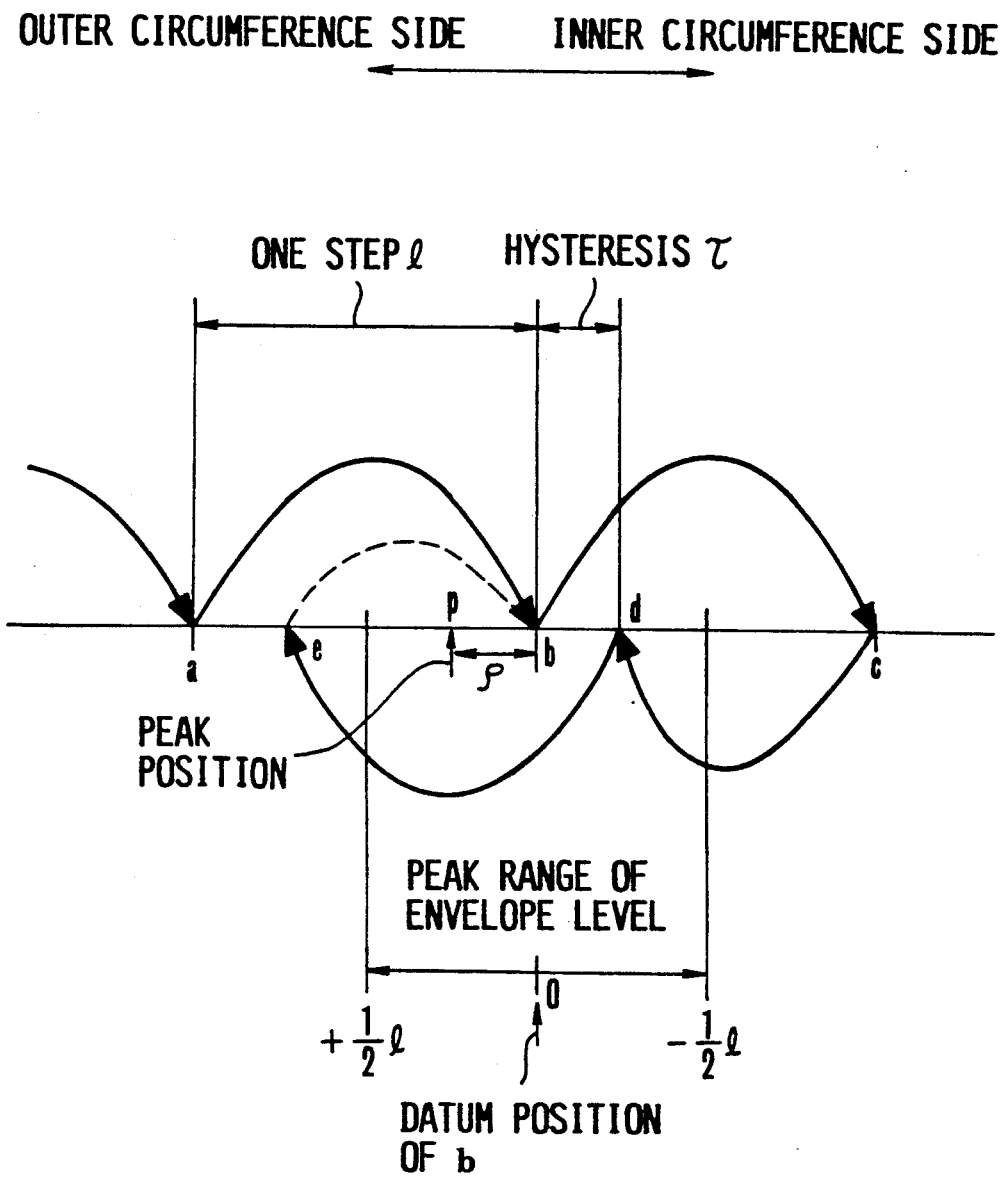
FIG. 6 is an illustration showing an error resulting from the ATF action of the embodiment of this invention.

Next, the error or accuracy of the ATF action performed according to this invention is described as follows: Referring to FIG. 6, the magnetic head 2 is shifted stepwise in the sequence of positions a-b-c for finding a head position where the signal reproduced by the head has a peak envelope level. In the case of the conventional device, the head is shifted one step backward after the head has been moved forward up to the position "c". The backward shift brings the head to a position "d" and the ATF action is terminated there. Assuming that the one-step shifting distance is expressed as l and the hysteresis as $\tau$, a maximum distance between the peak position "P" and the position "d" is as follows:

$$\frac{1}{2} l + \tau \quad (1)$$

Therefore, the position in which the head is set deviates from the peak position to an extent corresponding to the hysteresis.

Whereas, in accordance with this invention, the head is shifted further backward from the position "d" by one more step to bring it to a position "e". Then, the envelope levels obtained at the positions "d" and "e" are compared with each other. If the level obtained at the position "d" is higher than the level obtained at the position "e", the head is shifted in the direction reverse to the direction in which it has been shifted to the position "e". If the level at the position "e" is higher than the level at the position "d", the head is set in the position "e" and the ATF action is brought to an end there.

With the position "b" deemed to be a datum point in FIG. 6, the peak position "p" (a distance between the positions "b" and "p" is $\rho$) is assumed to be within a range of $\pm\frac{1}{2}l$ ($\frac{1}{2}$ step). There obtains the following relation:

$$-\frac{1}{2} l \leq \rho \leq \frac{1}{2} l$$

Then a distance from the position "p" to the position "d" becomes:

$$\rho + \tau \quad (2)$$

A distance between the positions "e" and "p" is:

$$l - (\rho + \tau) \quad (3)$$

The ATF action is terminated at the head position "e" if a middle point between the positions "e" and "d" is on the right side of the peak position "p" as viewed on FIG. 6. If it is on the left side of the peak position "p", the ATF action is terminated at the position "b" by shifting the head one step backward. The middle point between the positions "e" and "d" is located at the following distance from the position "b":

$$\frac{1}{2} l - \tau \quad (4)$$

Therefore, the ATF action is terminated at the position "e" in the case of "$\rho > \frac{1}{2} l - \tau$". Then, the distance from the peak position "p" to the position "e" can be obtained from Formula (3) as follows:

$$\rho > \frac{1}{2} l - \tau$$

$$\rho + \tau > \frac{1}{2} l$$

Therefore.

$$l - (\rho + \tau) \leq \frac{1}{2} l \quad (5)$$

If $\tau < 1/2 - \rho$, the head is shifted one step from the position "e" to bring it to the position "b" to terminate the ATF action there. Therefore, the distance $\rho$ between the peak position "p" and the position "b" then becomes:

$$-\frac{1}{2} l \leq \rho \leq \frac{1}{2} \quad (6)$$

As apparent from Formulas (5) and (6) above, the error or accuracy of the ATF action according to this invention is within the range of $\pm\frac{1}{2}l$. In other words, it is within $\frac{1}{2}$ step in absolute value. This means a great improvement over the conventional device in head positioning accuracy. (Note that the hysteresis τ is assumed to be within one step 1.)

As described in the foregoing, the head driving device according to this invention is arranged to shift the head backward by two steps of the unit shifting extent when the magnetic head shifting direction is reversed during the process of the ATF action; to compare with each other the envelope levels obtained by each of two steps of the backward shift of the head; and to determine the head stopping position according to the result of comparison. The arrangement prevents any faulty performance of the ATF action. Besides, the possible degree of error of the ATF action can be held within a range less than ½ step. Even if the hysteresis of the head shifting mechanism causes a discrepancy between the head driving position of the drive source and the actually shifted position of the head, the head can be accurately positioned on the track of a desired record without being affected by the discrepancy.

In the case of the embodiment described, the invention is applied to an apparatus using a magnetic disc. However, the invention is not limited to the apparatuses of this kind but is also applicable to the apparatuses of varied kinds including, for example, an apparatus using an optical pick-up element or the like.

What is claimed is:

1. A head driving device comprising:
  a) head driving means arranged to shift a head relative to a recording track on a recording medium stepwise in units of a predetermined driving extent;
  b) detecting means for detecting the level of a signal reproduced by said head; and
  c) control means for controlling said head driving means to have said head shifted in a direction of obtaining a maximum output of said detecting means,
  wherein: when the head shifting direction is reversed, said control means causes said head to be shifted in the reverse direction at least by two steps in units of said driving extent; and a stopping position of said head is determined on the basis of an output of said detecting means obtained at each of head positions obtained by shifting said head two or more steps.

2. A device according to claim 1, wherein said recording medium is a rotary disc-shaped recording medium, and wherein said head driving means is arranged to shift said head in a radial direction of said recording medium.

3. A device according to claim 2, wherein said head driving means includes a stepping motor and is arranged to drive said head by said stepping motor stepwise in units of a predetermined number of steps.

4. A device according to claim 1, wherein said detecting means includes a detection circuit arranged to detect the envelope of a signal reproduced by said head.

5. A device according to claim 1, wherein; said control means is arranged to compare with each other outputs of said detecting means obtained at a plurality of consecutively shifted positions of said head; to drive said head in the direction of increasing an output of said detecting means; and, when the head driving direction is reversed, to shift said head by two steps in units of said driving extent in the reverse direction in a case where said output obtained before the reversal of direction does not increase after the reversal of direction while ignoring the output of said detecting means obtained immediately after the reversal of direction.

6. A device according to claim 5, wherein said control means is provided with an identification flag for indicating the direction in which said head is being shifted, said flag being set when the head shifting direction is reversed, and said flag being arranged to indicate the arrival of said head at an angle part of a desired recording track.

7. A device according to claim 5, wherein said control means is arranged to determine the position of said head within an error range of ±½ or less of said unit driving extent.

8. A head positioning device comprising:
  a) head driving means for driving a head to a designated position by shifting said head stepwise in units of a predetermined shifting extent;
  b) detecting means arranged to detect a discrepancy between the position of said head and said designated position and to output information corresponding to said discrepancy; and
  c) control means for controlling the driving direction of said head by controlling said head driving means on the basis of the information output from said detecting means, wherein the driving direction of said head is reversed, said control means causes said head to be shifted at least two steps in units of said shifting extent and controls said head driving means on the basis of the information output from said detecting means at each of head positions obtained after the reversal of direction.

9. A device according to claim 8, wherein said head is a magnetic head arranged to reproduce information recorded in concentric recording tracks formed on a rotary magnetic disc.

10. A device according to claim 9, wherein said head driving means includes a stepping motor arranged to shift said head in units of a predetermined number of steps.

11. A device according to claim 8, wherein said detecting means includes a detection circuit arranged to detect the envelope of a signal reproduced by said head.

12. A device according to claim 8, wherein; said control means is arranged to compare with each other outputs of said detecting means obtained at a plurality of consecutively shifted positions of said head; to drive said head in the direction of increasing an output of said detecting means; and, when the head driving direction is reversed, to shift said head by two steps in units of said driving extent in the reverse direction in a case where said output obtained before the reversal of direction does not increase after the reversal of direction while ignoring the output of said detecting means obtained immediately after the reversal of direction.

13. A device according to claim 12, wherein said control means is provided with an identification flag for indicating the direction in which said head is being shifted, said flag being set when the head shifting direction is reversed, and said flag being arranged to indicate the arrival of said head at an edge part of a desired recording track.

14. A device according to claim 12, wherein said control means is arranged to determine the position of said head within an error range of ±½ or less of said unit driving extent.

15. A reproducing apparatus comprising:
  a) a reproducing head arranged to reproduce a signal recorded in a recording track formed on a recording medium;

b) detecting means for detecting the level of a signal produced by said reproducing head;

c) head driving means for shifting said reproducing head in units of a predetermined number of steps; and d) control means for controlling said head driving means to have said head shifted in a direction of increasing said reproduced signal level detected by said detecting means, said control means being arranged to control said head driving means to shift said head at least by two steps in units of said predetermined number of steps when the shifting direction of said head is reversed.

16. An apparatus according to claim 15, wherein said recording medium is a magnetic disc.

17. An apparatus according to claim 16, wherein said head driving means includes a stepping motor arranged to drive said reproducing head.

18. An apparatus according to claim 15, wherein said detecting means includes a detection circuit arranged to detect the envelope of a signal reproduced by said head.

19. An apparatus according to claim 15, wherein; said control means is arranged to compare with each other outputs of said detecting means obtained at a plurality of consecutively shifted positions of said head; to drive said head in the direction of increasing an output of said detecting means; and, when the head driving direction is reversed, to shift said head by two steps in units of a driving extent of said means in the reverse direction in a case where said output obtained before the reversal of direction does not increase after the reversal of direction while ignoring the output of said detecting means obtained immediately after the reversal of direction.

20. An apparatus according to claim 19, wherein said control means is provided with an identification flag for indicating the direction in which said head is being shifted, said flag being set when the head shifting direction is reversed, and said flag being arranged to indicate the arrival of said head at an edge part of a desired recording track.

21. An apparatus according to claim 19, wherein said control means is arranged to determine the position of said head within an error range of $\pm\frac{1}{2}$ or less of said unit driving extent.

22. A reproducing apparatus comprising:

a) a reproducing head arranged to reproduce a signal recorded in a recording track formed on a recording medium;

b) detecting means for detecting the level of a signal reproduced by said reproducing head;

c) head driving means for shifting said reproducing heads in units of a predetermined driving amount; and d) control means for controlling said head driving means to reverse a shifting direction of said head and to drive said head two times at least in units of said predetermined driving amount in the reverse direction when the output level of said detecting means at a current head position is substantially equal to or lower than the output level at a previous head position.

23. A reproducing apparatus according to claim 22, wherein said control means is arranged to compare, when said head is reversed, the output level of said detecting means immediately before the reversal with the output level of said detecting means at the position where said head is shifted by two steps in units of said predetermined driving amount after the reversal and then to decide a next shifting direction and a stop of said head.

* * * * *

UNITED STATES PATENT AND TRADEMARK OFFICE
CERTIFICATE OF CORRECTION

PATENT NO. : 5,227,931

DATED : July 13, 1993

INVENTOR(S) : Hiroyoshi Misumi

It is certified that error appears in the above-indentified patent and that said Letters Patent is hereby corrected as shown below:

Col. 1, line 36.  Change "1(b)-2" to -- 1(b)-1 -- (first occurrence)
Col. 4, line 6.   After "1(b)-1" insert --,1(b)-2 --
Col. 6, line 7.   Delete "in"
Col. 8, line 14.  Delete "the"
Col. 9, line 8.   Change "little shifted" to -- shifted little
Col. 9, line 9.   Change "FIG." to -- FIGS. --
Col. 9, line 10.  After "5(b)-" insert -- 1 and --
Col. 10, line 28. Change "5(b-1" to -- 5(b)-1 --
Col. 10, line 61. Change "just has" to -- has just --
Col. 11, line 24. After "memory" insert -- 10. The --
Col. 11, line 57. Change "1" to -- $\ell$ --

UNITED STATES PATENT AND TRADEMARK OFFICE
CERTIFICATE OF CORRECTION

PATENT NO. : 5,227,931

DATED : July 13, 1993

INVENTOR(S) : Hiroyoshi Misumi

It is certified that error appears in the above-indentified patent and that said Letters Patent is hereby corrected as shown below:

Col. 12, line 56. Change "$\gamma < 1/2-p,$" to -- $p < \bar{2} - \gamma,$ --

Col. 13, line 3. Change "1" to -- $\ell$ --

Col. 15, line 2. Change "produced" to -- reproduced --

Col. 15, line 29. After "said" insert -- driving --

Signed and Sealed this

Twelfth Day of April, 1994

Attest:

BRUCE LEHMAN

*Attesting Officer*   *Commissioner of Patents and Trademarks*